Patented May 20, 1930

1,759,259

UNITED STATES PATENT OFFICE

ERWIN HOFFA AND FRITZ MÜLLER, OF HOCHST-ON-THE-MAIN, GERMANY, ASSIGNORS TO GENERAL ANILINE WORKS, INC., OF NEW YORK, N. Y., A CORPORATION OF DELAWARE

AZO DYESTUFFS AND PROCESS OF PREPARING THEM

No Drawing. Application filed December 7, 1927, Serial No. 238,457, and in Germany December 13, 1926.

This invention relates to azo dyestuffs and processes of preparing them.

We have found that by coupling with any coupling component a cyanogen aryldiazo compound prepared from an amine of the following formula:

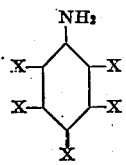

wherein one X stands for the group —CN and the other X's for hydrogen or any substituent, which latter may be of such a kind as to make the finally obtained dyestuff water-soluble or not, azo dyestuffs are obtained which when the components are selected in a suitable manner meet high requirements as regards fastness to kier-boiling and are distinguished by clear tints of excellent fastness to light.

The dyestuffs can be produced either in substance or on the fiber or on other substrata.

The following examples illustrate our invention, but they are not intended to limit it thereto:

1. Cotton fiber is padded in the usual manner with the following grounding liquor: 8 parts by volume of formaldehyde of 30 per cent strength are added to a solution prepared from 8 parts by weight of 2.3-hydroxynaphthoic acid-4-chloro-2-anisidide, 16 parts by volume of sodium Turkey red oil, 16 parts by volume of caustic soda solution of 34° Bé. and 500 parts by volume of hot water, and the whole is made up with water to 1000 parts by volume. The diazo solution is prepared as follows: 2.6 parts by weight of 5-cyanogen-2-toluidine are mixed, while stirring, with 5.2 parts by volume of hydrochloric acid of 22° Bé. and ice-cold water, and to this mixture are added 1.44 parts by weight of sodium nitrite dissolved in water. After the diazotization is complete the whole is made up with cold water to 1000 parts by volume and neutralized with sodium acetate until the mass shows a neutral reaction towards Congo paper. On developing the padded fibre in the diazo solution so prepared a bright red tint is obtained of excellent fastness properties. The dyestuff has probably the formula:

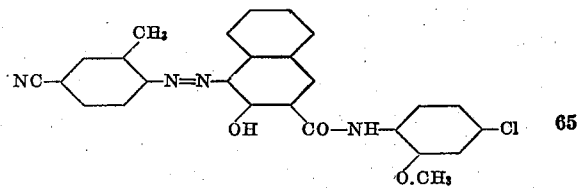

2. The grounding liquor is prepared as follows: 3 parts by weight of diacetoacetic acid-ortho-tolidide, 6 parts by volume of sodium Turkey red oil of 50 per cent strength and 6 parts by volume of caustic soda solution of 34° Bé. are dissolved in 500 parts by volume of hot water, there are added thereto 28 parts by weight of crystallized sodium sulfate and the whole is made up with water to 1000 parts by volume. Cotton padded with this grounding liquor is developed with a diazo solution prepared as indicated in Example 1 to which there have further been added 1.5 parts by volume of acetic acid of 50 per cent strength. A reddish-yellow tint is thus obtained having excellent properties as to fastness. The dyestuff has probably the following formula:

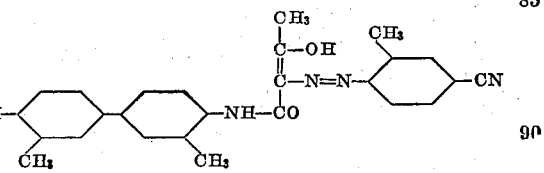

3. By substituting in Example 1 for the 8 parts by weight of 2.3-hydroxynaphthoic acid-4-chloro-2-anisidide 7.7 parts by weight of 2.3-hydroxynaphthoic acid-α-naphthylamide and for the 2.6 parts by weight of 5-cyanogen-2-toluidine 2.3 parts by weight of 1-amino-3-cyanogen-6-methylbenzene, bluish-red of excellent fastness to light is obtained.

The dyestuff has probably the following formula:

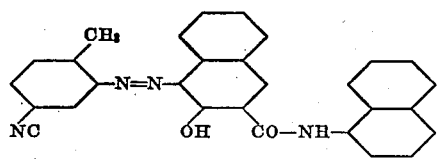

4. 16.2 parts by weight of 4-cyanogen-2-amino-1-benzoic acid are dissolved in 11 parts by weight of sodium carbonate and 250 parts of water, to this solution are added 7 parts by weight of sodium nitrite and then the mass is introduced at 0° C., while stirring, into a mixture of 40 parts by weight of hydrochloric acid of 36 per cent strength and 200 parts of ice and water. The diazo solution is somewhat neutralized by means of a dilute solution of sodium carbonate and clarified by filtering it. It is then run into a solution of 24.6 parts by weight of sodium 1-hydroxy-naphthalene-4-sulfonate in 25 parts by weight of sodium acetate and 350 parts of water. The dyestuff separates in the form of orange-colored laminæ. It dyes from an acid bath wool an orange tint of good fastness properties which by an after-treatment with a chromate is transformed into a reddish-violet of likewise good properties as to fastness.

The following table indicates a number of dyestuffs which can be made in accordance with our present invention.

We claim:

1. The process of preparing azo dyestuffs by diazotizing an arylamine of the following formula:

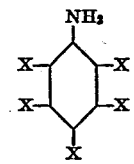

wherein one X stands for the group —CN and the other X's for hydrogen or any substituent, and coupling it with an azo component capable of being coupled with diazocompounds.

2. The process of preparing azo dyestuffs by diazotizing an arylamine of the following formula:

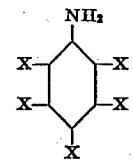

wherein one X stands for the group —CN and the other X's for hydrogen or any substituent which does not render the product soluble in water, and coupling it with an azo component capable of being coupled with diazo compounds.

3. The process of preparing azo dyestuffs by diazotizing an arylamine of the following formula:

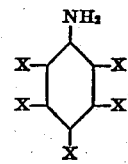

| Diazo-compound of | Coupled with | Properties of the dyeing produced on the fibre |
|---|---|---|
| 1-amino-3-cyanogen-2-methylbenzene | 2.3-hydroxynaphthoic acid-2'-methyl-4'-chloro-1'-anilide | Bright scarlet fast to light |
| 1-amino-2-cyanogen-4-chlorobenzene | 2.3-hydroxynaphthoic acid-1'-naphthylamide | Bright claret-red fast to light |
| 1-amino-2-cyanogen-4-chlorobenzene | 2.3-hydroxynaphthoic acid-anilide | Bright reddish-orange fast to light |
| 1-amino-2-cyanogen-4-chlorobenzene | 2.3-hydroxynaphthoic acid-2'-toluidide | Bright yellowish scarlet fast to light |
| 1-amino-2-cyanogen-4-chlorobenzene | 2.3-hydroxynaphthoic acid-2'-methyl-4'-chloro-1'-anilide | Bright yellowish scarlet fast to light |
| 1-amino-2.4-dimethyl-5-cyanogen-benzene | 2.3-hydroxynaphthoic acid-2'-methyl-1'-anilide | Bright scarlet of good fastness to light |
| 1-amino-3-cyanogen-6-chlorobenzene | 2.3-hydroxynaphthoic acid-2'-methyl-4'-chloro-1'-anilide | Bright yellowish scarlet fast to light |
| 1-amino-3-cyanogen-6-chlorobenzene | 2.3-hydroxynaphthoic acid-4'-methoxy-1'-anilide | Bright yellowish scarlet fast to light |
| 1-amino-3-cyanogen-6-chlorobenzene | 2.3-hydroxynaphthoic acid-2'-methyl-1'-anilide | Bright yellowish scarlet fast to light |
| 1-amino-3-cyanogen-6-chlorobenzene | 2.3-hydroxynaphthoic acid-1'-anilide | Bright yellowish scarlet fast to light |
| 1-amino-2-cyanogen-5-methylbenzene | 2.3-hydroxynaphthoic acid-2'-methyl-4'-chloro-1'-anilide | Bright reddish-orange fast to light |
| 1-amino-2-cyanogen-5-methylbenzene | 2.3-hydroxynaphthoic acid-1'-anilide | Bright scarlet of good fastness to light |
| 1-amino-2-cyanogen-5-methylbenzene | 2.3-hydroxynaphthoic acid-2'-methoxy-5'-chloro-1'-anilide | Orange of good fastness to light |
| 1-amino-2-cyanogen-5-chlorbenzene | 2.3-hydroxynaphthoic acid-2'-methyl-4'-chloro-1'-anilide | Bright reddish-orange of good fastness to light |

Instead of the 2.3-hydroxynaphthoic acid arylides there may be used with a similar result as coupling components β-ketocarboxylic acid-arylides.

wherein one X stands for the group —CN and the other X's for hydrogen or any substituent which does not render the product soluble in water, and coupling it with a 2.3-hydroxynaphthoic acid-arylamide.

4. The process of preparing azo dyestuffs by diazotizing an arylamine of the following formula:

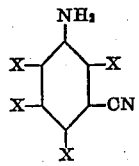

wherein X stands for hydrogen or any substituent which does not render the product soluble in water and coupling it with a 2.3-hydroxynaphthoic acid-arylamide.

5. The process of preparing azo dyestuffs by diazotizing an arylamine of the following formula:

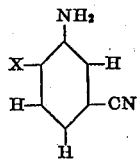

wherein X stands for hydrogen or any substituent which does not render the product soluble in water and coupling it with a 2.3-hydroxynaphthoic acid-arylamide.

6. The process of preparing azo dyestuffs by diazotizing 1-amino-3-cyanogen-6-methyl-benzene of the following formula:

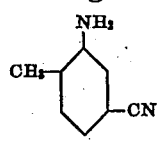

and coupling it with a 2.3 hydroxynaphthoic acid-arylamide.

7. As new products, azo dyestuffs substantially identical with dyestuffs obtainable by diazotizing an arylamine of the following formula:

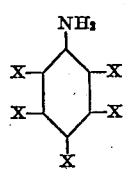

wherein one X stands for the group —CN and the other X's for hydrogen or any substituent, and coupling it with an azo component capable of being coupled with diazocompounds, said products being powders the color of which varies from yellow to blue and yellow to brown.

8. As new products, azo dyestuffs substantially identical with dyestuffs obtainable by diazotizing an arylamine of the following formula:

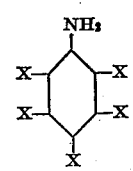

wherein one X stands for the group —CN and the other X's for hydrogen or any substituent which does not render the product soluble in water, and coupling it with an azo component capable of being coupled with diazocompounds, said products being powders the color of which varies from yellow to blue and yellow to brown.

9. As new products, azo dyestuffs of the following formula:

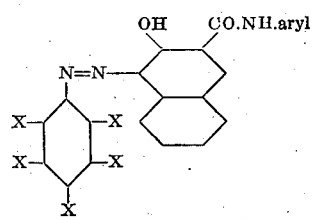

wherein one X stands for the group —CN, the other X's for hydrogen or any substituent which does not render the product soluble in water and the aryl stands for an aryl group the hydrogen atoms of which may be substituted or not, said products being powders the color of which varies from yellow to blue and from yellow to brown.

10. As new products, azo dyestuffs of the following formula:

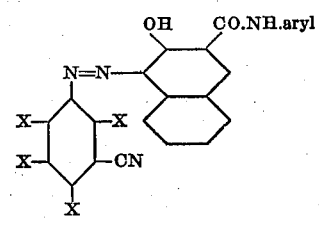

wherein X stands for hydrogen or any substituent which does not render the product soluble in water and the aryl stands for an aryl group the hydrogen atoms of which may be substituted or not, said products being yellowish-red to bluish-red and yellowish-red to brownish-red powders and yielding when produced on the fiber dyeings of very good fastness properties.

11. As new products, azo dyestuffs of the following formula:

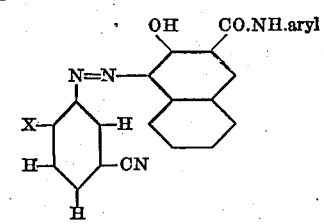

wherein X stands for hydrogen or any substituent which does not render the product soluble in water and the aryl stands for an aryl group the hydrogen atoms of which may be substituted or not, said products being yellowish-red to bluish-red and yellowish-red to brownish-red powders and yielding when produced on the fiber dyeings of very good fastness properties.

12. As new products, azo dyestuffs of the following formula:

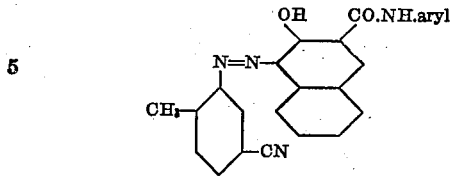

wherein aryl stands for an aryl group the hydrogen atoms of which may be substituted or not, said products being yellowish-red to bluish-red and yellowish-red to brownish-red powders and yielding when produced on the fiber dyeings of very good fastness properties.

13. As a new product, the dyestuff of the following constitution:

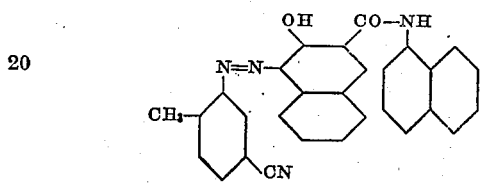

said product being a bluish-red powder and yielding when produced on the fiber dyeings of excellent fastness to light.

In testimony whereof, we affix our signatures.

ERWIN HOFFA.
FRITZ MÜLLER.